US012688490B1

(12) United States Patent
Li et al.

(10) Patent No.: US 12,688,490 B1
(45) Date of Patent: Jul. 21, 2026

(54) REAL-TIME CLOUD API FOR BITCOIN MINING SYSTEMS

(71) Applicant: Auradine, Inc., Santa Clara, CA (US)

(72) Inventors: Liang Li, Cupertino, CA (US); Aditya Batra, Saratoga, CA (US); Robert Ashley, San Jose, CA (US); Patrick Xu, Saratoga, CA (US); Sridhar Chirravuri, Sunnyvale, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 18/784,756

(22) Filed: Jul. 25, 2024

Related U.S. Application Data

(63) Continuation-in-part of application No. 18/744,435, filed on Jun. 14, 2024, now Pat. No. 12,192,336, and a continuation-in-part of application No. 18/737,917, filed on Jun. 7, 2024.

(60) Provisional application No. 63/528,894, filed on Jul. 25, 2023, provisional application No. 63/521,068, filed on Jun. 14, 2023, provisional application No. 63/471,668, filed on Jun. 7, 2023.

(51) Int. Cl.
G06Q 20/06 (2012.01)

(52) U.S. Cl.
CPC ....... G06Q 20/065 (2013.01); G06Q 2220/00 (2013.01)

(58) Field of Classification Search
None
See application file for complete search history.

(56) References Cited

U.S. PATENT DOCUMENTS

| | | | |
|---|---|---|---|
| 11,139,955 B1 | 10/2021 | So et al. | |
| 2008/0317004 A1 | 12/2008 | Cai et al. | |
| 2017/0262460 A1 * | 9/2017 | Nordstrom | H04L 41/08 |
| 2018/0091621 A1 * | 3/2018 | Kuo | H04L 67/565 |
| 2018/0247191 A1 | 8/2018 | Katz et al. | |

(Continued)

FOREIGN PATENT DOCUMENTS

| | | | | |
|---|---|---|---|---|
| KR | 20220116915 A * | 8/2022 | | G06Q 20/02 |
| KR | 1020230000865 A | 1/2023 | | |
| WO | 2019232789 A1 | 12/2019 | | |

OTHER PUBLICATIONS

Casey; Keith "What Is an API" [online] okta, Oct. 2, 2020 [retrieved Oct. 14, 2024]. Retrieved from the Internet: URL: https://www.okta.com/blog/2020/10/api-application-programming-interface/ (Year: 2020).*

(Continued)

*Primary Examiner* — Taghi T Arani
*Assistant Examiner* — Joshua Raymond White
(74) *Attorney, Agent, or Firm* — Shield Intellectual Property PC; Kirk D. Wong

(57) ABSTRACT

Digital currency mining systems establish and maintain real-time communication channels using Application Programming Interfaces (APIs) with a central management service. The central management service stores configuration and status information for the digital currency mining systems and configures and controls the digital currency mining systems via the APIs. User devices authorize and establish real-time communication channels using the central management service APIs. User devices access statistical, configuration, and status information of the digital currency mining systems via central management service APIs.

20 Claims, 5 Drawing Sheets

(56) References Cited

U.S. PATENT DOCUMENTS

| | | | |
|---|---|---|---|
| 2019/0108543 A1 | 4/2019 | Chan et al. | |
| 2019/0268142 A1 | 8/2019 | Leker et al. | |
| 2020/0327137 A1* | 10/2020 | Farver | G06F 16/1805 |
| 2021/0028983 A1* | 1/2021 | Balakrishnan | G06F 11/3055 |
| 2021/0250307 A1 | 8/2021 | Pal et al. | |
| 2021/0256536 A1 | 8/2021 | Abdelsamie | |
| 2022/0029801 A1 | 1/2022 | Velagapalli et al. | |
| 2023/0169595 A1* | 6/2023 | Fresa | G06F 1/3234 |
| 2023/0188363 A1 | 6/2023 | Aoshima | |
| 2023/0354035 A1 | 11/2023 | Sun | |
| 2024/0144249 A1* | 5/2024 | Swami | G06Q 20/401 |
| 2024/0169050 A1 | 5/2024 | Gehtman et al. | |
| 2024/0193567 A1 | 6/2024 | Bettati et al. | |

OTHER PUBLICATIONS

Nystrom et al. "PKCS #10: Certification Request Syntax Specification" [online] IETF, Nov. 2000 [retrieved Apr. 24, 2025]. Retrieved from the Internet. URL: https://datatracker.ietf.org/doc/html/rfc2986 (Year: 2000).*

United States Patent and Trademark Office, U.S. Appl. No. 18/737,917, Final Office Action dated Jan. 17, 2025.

Soltysik et al., "Improvement Of Operating Efficiency Of Energy Cooperatives With The Use Of Crypto-Coin Mining", Energies, vol. 15, Issue 21, pp. 1-25, Oct. 30, 2023.

World Intellectual Property Organization, Application No. PCT/US24/33156, International Search Report dated Sep. 23, 2024.

United States Patent and Trademark Office, U.S. Appl. No. 18/737,917, Non-Final Office Action dated Sep. 6, 2024.

United States Patent and Trademark Office, U.S. Appl. No. 18/744,435, Notice of Allowance dated Aug. 30, 2024.

United States Patent and Trademark Office, U.S. Appl. No. 18/737,917, Non-Final Office Action dated Jun. 3, 2025.

United States Patent and Trademark Office, U.S. Appl. No. 18/737,917, Final Office Action dated Nov. 25, 2025.

* cited by examiner

REAL-TIME CLOUD API FOR BITCOIN MINING SYSTEMS

CROSS-REFERENCE TO RELATED APPLICATIONS

This application claims priority to Provisional Appln. No. 63/528,894 filed Jul. 25, 2023, the entire contents of which is hereby incorporated by reference as if fully set forth herein, under 35 U.S.C. § 120. This application further claims the benefit under 35 U.S.C. § 120 as a Continuation-in-part of U.S. application Ser. No. 18/737,917, filed Jun. 7, 2024, which claims priority to Provisional Appl. No. 63/471, 668 filed Jun. 7, 2023, and as a Continuation-in-part of U.S. application Ser. No. 18/744,435, filed Jun. 14, 2024, which claims priority to Provisional Appln. No. 63/521,068 filed Jun. 14, 2023, the entire contents of the aforementioned are hereby incorporated by reference as if fully set forth herein, under 35 U.S.C. § 120.

TECHNICAL FIELD

Embodiments relate generally to improving computer system security, and, more specifically, to improving the security of bitcoin mining systems.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Bitcoin mining is an asset and energy intensive task. Bitcoin mining systems compete to solve a cryptographic problem that results in bitcoin awards. This is a high computing processor demand process that stresses the computers and, as a byproduct, requires higher energy consumption for each mining system. When bitcoin mining is performed at an industrial scale, large numbers of machines are deployed in large bitcoin mining sites. Current mining systems, when deployed at scale, may sit on the rack for hours or days before being configured to mine. This delay results in lost revenue.

During normal operation, bitcoin mining systems typically rely on agents deployed in datacenters to send data to and receive commands from the central fleet management software usually deployed in the cloud or another data center. Agents poll the bitcoin mining systems and receive the data from the bitcoin mining systems. Additional agents are deployed as more bitcoin mining systems are added to the fleet. This approach often has a long delay with the agents updating the central fleet management software due to the pulling mode of data transfer and the need to reduce the pulling frequency to reduce cost.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
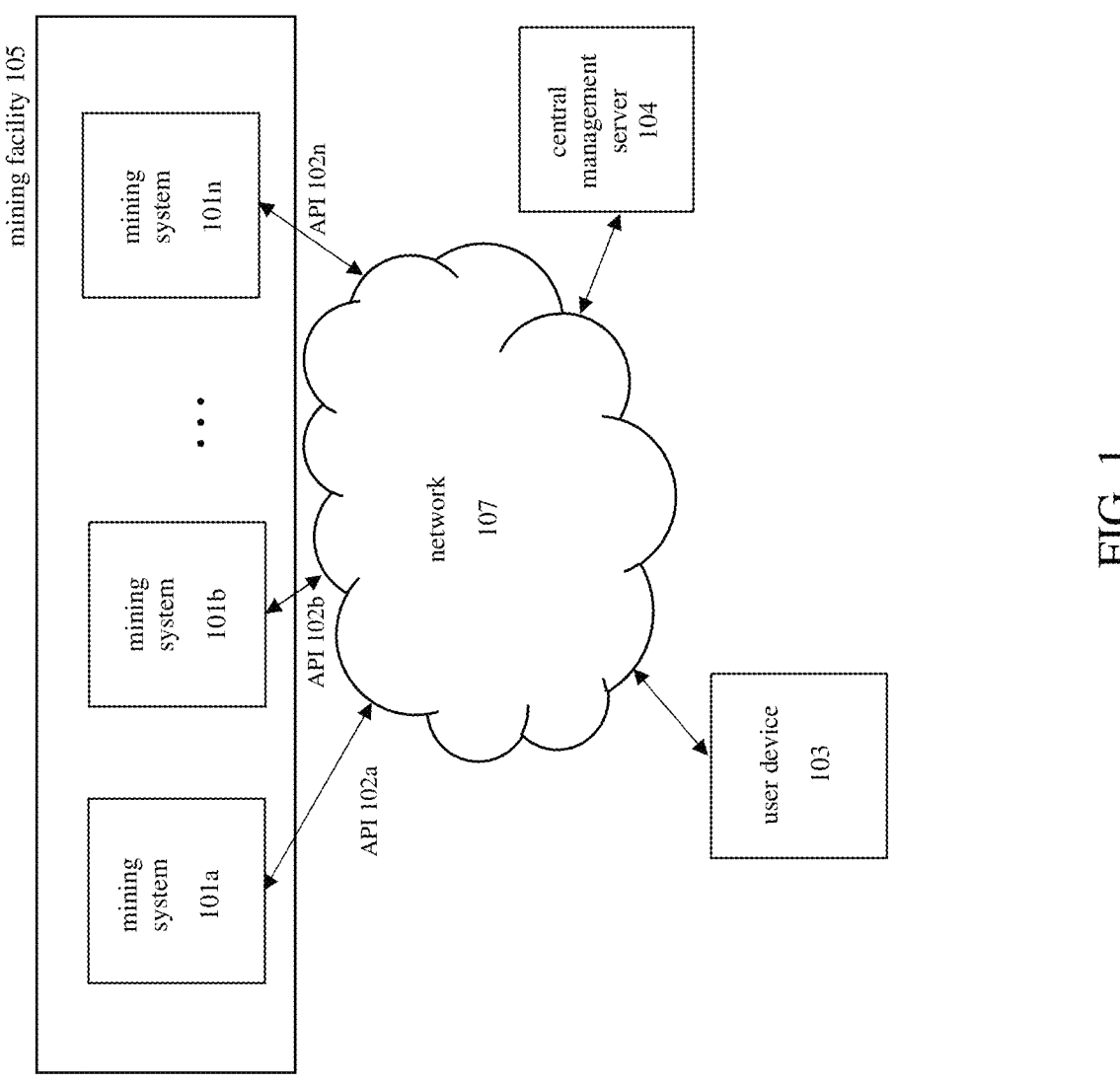
FIG. 1 illustrates a block diagram of a bitcoin mining environment, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. System Architecture
3.0. Implementation Mechanism—Hardware Overview
4.0 Extensions and Alternatives

1.0. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format and should be understood as merely a conceptual prelude to a more detailed description of example possible embodiments that follows below.

When digital currency/cryptocurrency mining systems, e.g., bitcoin mining systems are deployed in large industrial-scale mining facilities, technicians typically mount each system into their appropriate rack and connect the systems to the power. When the bitcoin mining systems are first booted up, the systems need to be configured. In the case where there are a large number of systems being brought online, the amount of work required to get each system up and running is onerous. Each system has traditionally been required to be configured manually in order for the system to start mining for the customer. Many bitcoin miner providers take advantage of the situation where, in a default configuration state, bitcoin mining systems are powered on in the customer's bitcoin mining facility by initializing the bitcoin mining systems to start mining immediately but for the bitcoin provider rather than the customer. By the time the customer's technicians have properly configured all of the systems, a large amount of time has passed where the bitcoin mining systems have not produced any results by sitting idle or, in some cases, the bitcoin mining systems have produced revenue for the bitcoin miner providers.

Zero Touch Provisioning (ZTP) has been used for networking devices and IoT devices. The method that is typically used in the networking industry is not secure because it is assumed that the device is correctly embedded with the appropriate link to the configuration server. The router, network device, etc., is configured at the factory with the link to the appropriate configuration server. Once the device boots up, it contacts the configuration server to download the latest firmware version. However, ZTP by itself is not secure for bitcoin mining systems which is one of the reasons why manual configuration is used.

Since bitcoin mining systems create currency, the possibility of a corrupt or hijacked mining system is the reason why manual configuration has been necessary. Embodiments discussed herein improve the performance and security of the mining systems by providing a secure configuration environment where the mining systems can be securely configured in a timely manner. Thus, downtime is substantially decreased and performance for the entire facility is substantially improved.

In an embodiment, a trusted platform module (TPM) chip is incorporated into each of the bitcoin mining systems in a mining facility. The TPM chip is a secure encryption chip that allows the mining system to uniquely identify itself to a central management server in two different ways that gives two levels of security, one for general messaging and one for sensitive messaging. The TPM chip works in conjunction with mining system software to facilitate secure configuration of the bitcoin mining system as well as secure registration and recovery operations.

In an embodiment, the system has two levels of secure communications. Two pairs of keys are used to communicate with a central management server. A software generated key pair for normal, general communications between the bitcoin mining system and the central management server and a TPM key pair used for sensitive communications.

In an embodiment, two categories of application programming interfaces (APIs) are implemented to manage the bitcoin mining systems: miner APIs and system APIs. Miner APIs are used to access the bitcoin mining systems directly. A client system/user device can configure and communicate with a specific bitcoin mining system by accessing the miner API for that bitcoin mining system. A central management server may also use the miner APIs for any number of bitcoin mining systems in order to configure and communicate with the bitcoin mining systems.

A client system may also access the central management server via the cloud using the system API. This allows the client system to configure and obtain data from multiple bitcoin mining systems simultaneously via the central management server.

In an embodiment, bitcoin mining systems can establish and maintain real-time communication channels over Web Sockets with a cloud service provider/central management server, for example, and register endpoints for cloud management or other orchestration software to interact with directly over the cloud.

The embodiments discussed herein improve the bitcoin mining technology by eliminating the need for distributing agents or proxies on site or across a network and further enables the performance of power curtailment (and other miner actions) across multiple bitcoin mining systems in a few seconds compared to the lag introduced by the agents or proxies. The real-time response of the embodiments quickly adapt to dynamic power curtailment requirements and/or digital currency (e.g., bitcoin) price changes.

2.0. System Architecture

Referring to FIG. 1, in an embodiment, two categories of application programming interfaces (APIs) are implemented to manage the digital currency (bitcoin in this example) mining systems: miner APIs and system APIs. A plurality of bitcoin mining systems 101a-101n reside in mining facility 105. Miner APIs 102a-102n are used to access the bitcoin mining systems 101a-101n directly. Each bitcoin mining system 101a-101n provides miner APIs 102a-102n where a user device 103 or cloud-based central management server 104 (or service as discussed herein) can communicate with, configure, and control the bitcoin mining system over network 107 (e.g., Internet, extranet, cloud, etc.). The miner APIs 102a-102n can be used by higher level fleet management or data center management software 104 across the network 107 (e.g., Internet, intranet, etc.) to optimize fleet-wide operational metrics across a plurality of bitcoin mining systems 101a-101n as well as quickly and automatically respond to fluctuating energy costs and curtailment events. Client system/user device 103 can configure and communicate with a specific bitcoin mining system by accessing the miner API for that bitcoin mining system. The miner API 102a-102n can also provide a GUI based interface to the user device 103, where the user can, for example, select which metric (e.g., throughput, efficiency, total power, etc.) to use and a slider to select the value of the metric. The miner APIs 102a-102n allows access to multiple functions in the bitcoin mining systems, e.g., configuration settings such as: power consumption, hash rate, network settings, etc., system performance statistics and system information such as: internal temperatures, external temperatures, fan speed(s), hash rates, power settings, measured power consumption, etc.

In an embodiment, when multiple bitcoin mining systems 101a-101n are first booted up in the mining facility 105, each mining system 101a-101n reaches out to the central management/configuration server 104 to obtain initial configuration information in order to configure the bitcoin mining system to operate as per customer specifications. In order to perform this securely, each bitcoin mining system 101a-101n incorporates an on-board TPM chip that allows for secure communications between the bitcoin mining system 101a-101n and the cloud-based central management/configuration server 104.

Figure 2:
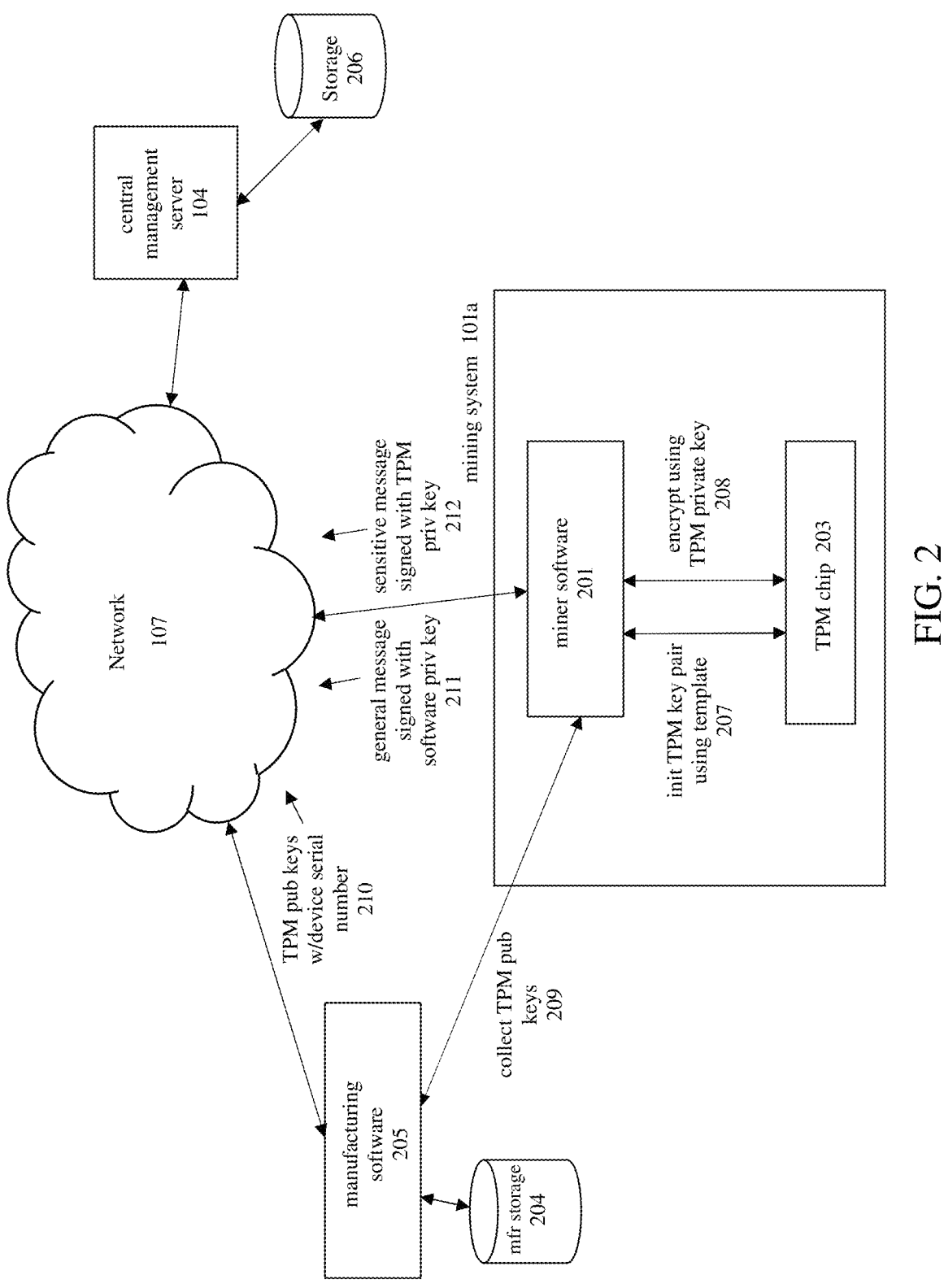
FIG. 2 illustrates a block diagram of communications between a mining system and manufacturing software and a central management server across a network, according to an embodiment.

Referring to FIG. 2, a block diagram of communications between a mining system 101a and manufacturing software 205 and a cloud-based central management/configuration server 104 is illustrated.

An embodiment automatically configures a mining system on first boot using user configurable settings stored in the cloud network 107. One such configuration could be network settings, where a mining system can connect to a gateway, reach out to the cloud network 107, and configure its customer-defined network settings using configuration data from, for example, a central management server 104. Once on the secured network, the mining system can start to mine with the other cloud-set configurations e.g., pool, worker, energy consumption mode, etc.

In an embodiment, during the manufacturing process the TPM chip 203 is manufactured with a set of fixed seeds unique to the TPM chip 203. The fixed seeds allow the TPM chip 203 to generate consistent RSA/ECC key pairs. When the mining system 101a is first booted up during the manufacturing process, the TPM chip 203 generates a public key and miner software 201 reports it along with the serial number of the TPM chip 203 and the key pair 209 generated by miner software 201 to the manufacturing software 205. Manufacturing software 205 stores the public key along with the mining system device serial number and software key pair in the manufacturing storage 204.

Cloud-based central management server 104 gathers the public keys and device serial numbers 210 from the manufacturing software 205 across network 107. Note that the public keys and serial numbers may additionally or alternatively be stored at a secure mining system manufacturer's site that is accessible to customer-owned central management servers. Cloud-based central management server 104 stores the public key and device serial numbers in storage 206. In an embodiment, central management server 104 stores the public keys and device serial numbers in a lookup table or other data structure such that the public keys are associated with their corresponding serial numbers. Note that there may be more than one manufacturing software as well as more than one cloud-based central management server, e.g., each customer can implement a cloud-based central management server for their sites.

At initial on-site bootup of the mining system 101a, the TPM chip 203 private key and public key can be generated at startup with a fixed template 207. The fixed template ensures that the keys that are generated are always the same and unique for each TPM chip 203, thereby foregoing the need to store them long term on local disk storage. The TPM public key is retrieved from a TPM driver in miner software 201 during boot up. Secure zero touch provisioning then takes place if configured to do so.

During normal operation, two pairs of keys are used to communicate (e.g., via JSON Web Tokens (JWTs), etc.) with the central management server 104. A software generated (e.g., by miner software 201) key pair for normal, general communications 211 between the mining system 101a and the central management server 104 and a TPM key pair used for sensitive communications 212 such as device registration, ownership change, etc. In general, using the TPM chip to encrypt messages is slower than using software keys to encrypt messages. The system improves the performance of the bitcoin mining systems as well as the cloud-based central management server by using the software keys whenever possible to make the communication paths more efficient and faster. Further, while typical systems manage their systems using a shared authorization certificate, an embodiment dramatically improves the security of the technology environment by storing unique authorization information for each device.

A message that is signed using the software key is used for general messaging to the cloud-based central management server 104. In normal operations, the message succeeds in verification by the cloud-based central management server 104. If a message fails verification, or a software key is missing from a recent factory reset, then software key pairs are purged from factory reset and the system reverts to using the TPM key as discussed below to onboard the device to the cloud-based central management server 104.

A message signed by the TPM chip 203 using the TPM key 208 is used for registering the software key pair with the cloud-based central management server 104 and initiating the secure zero touch provisioning. Miner software 201 sends the registration message to the TPM chip 203 to sign the message using the TPM private key. TPM chip 203 transmits the signed message 208 to the miner software 201. The registration message contains the mining system 101a serial number and the software public key. The message is signed using the TPM public key. Miner software 201 sends the signed message 212 to the cloud-based central management server 104. The cloud-based central management server 104 verifies the signature from the message using the TPM public key associated with the mining system 101a serial number stored in storage 206. In an embodiment, cloud-based central management server 104 uses the serial number to find the corresponding TPM public key in the data structure in storage 206. Cloud-based central management server 104 then hashes the message using the TPM public key and decrypts the signature using the TPM public key. If the hash value matches the decrypted signature from the message, then the message is valid. Upon verification, the cloud-based central management server 104 stores the software public key in association with the mining system 101a and sends configuration data to the mining system 101a. The central management server 104 has the ability to select which configuration data is used for each particular mining system, allowing for different configurations for certain groups of mining systems, types of mining systems (e.g., different hardware setups, different hardware vendors, etc.), etc. Configuration data can include the initial settings that the miner uses to start operations, e.g., power usage settings, target hash rates, WiFi settings, pool setting, worker ID, fan activation, etc. For example, an administrator may want to disable fans in the mining system when it is in standby mode if the facility is not set up for hot/cold aisles. Mining system 101a receives the configuration data and miner software 201 configures system parameters using the configuration data. Mining system 101a then operates using the updated system parameters. The configuration data can be updated at any time to change the ZTP configuration as conditions change in the facility and/or new mining systems. The entire communication exchange between miner software 201 and cloud-based central management server 104 can be encrypted using Transport Layer Security (TLS).

In an embodiment, the mining system 101a can retrieve a random server challenge (e.g., from/ping) to be included in the message (e.g., signed DATE, key in AWS KMS, etc.). The cloud-based central management server 104 verifies the message signature with the TPM public key (populated from manufacturing process) that is associated with the mining system serial number in the storage 206 and records the new software key pair in storage 206 to associate the software key pair with the mining system 101a. If an action such as ownership change of the mining system 101a is required, the miner software 201 sends the ownership change message to the TPM chip 203 for the TPM chip 203 to sign the message using the TPM private key. Miner software 201 sends the signed message to the cloud-based central management server 104 as discussed above.

Figure 3:
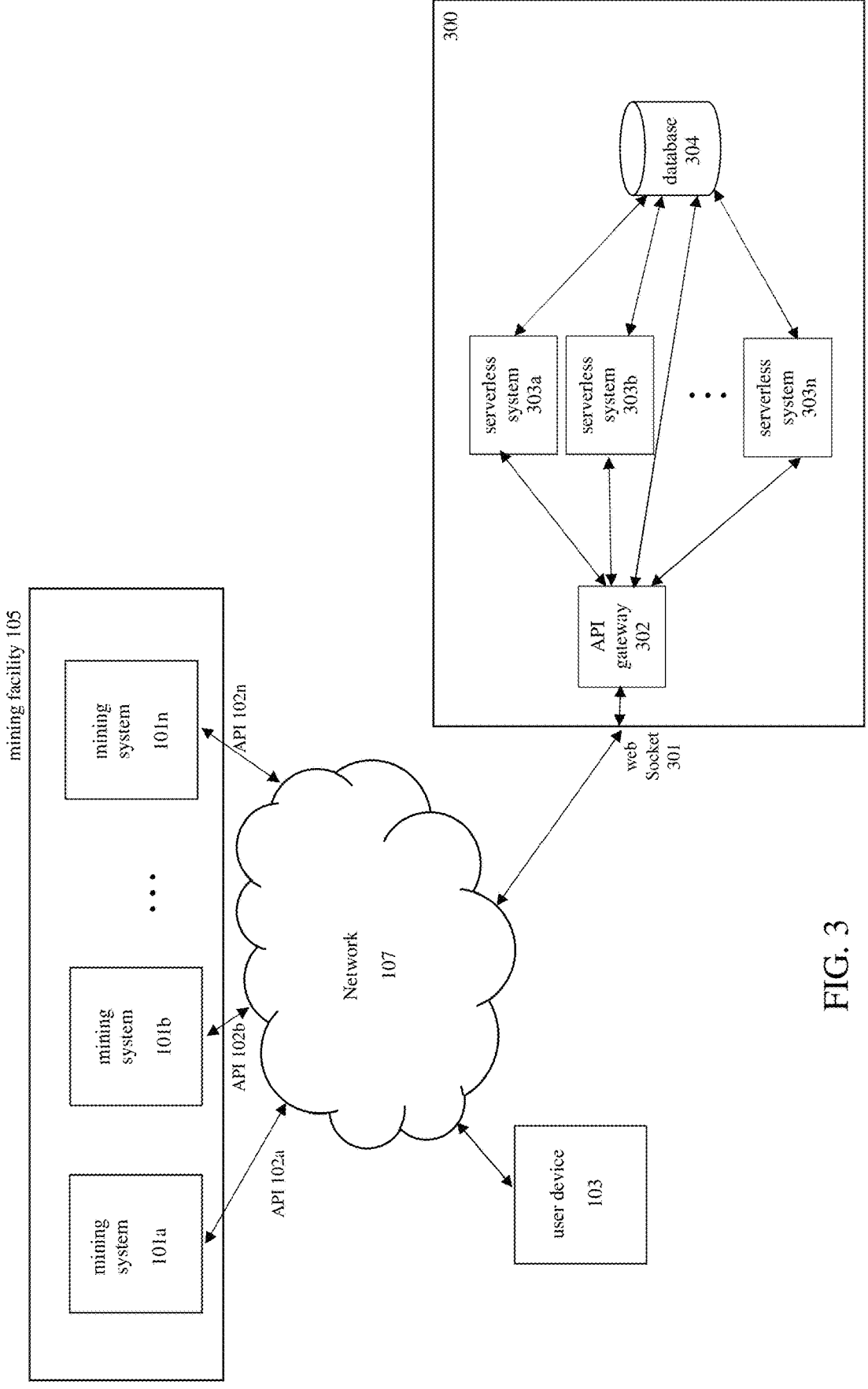
FIG. 3 illustrates a block diagram of communications between a user device, mining systems and a central management service across a network, according to an embodiment.

Referring to FIG. 3, in an embodiment, a user device/client system 103 may also access fleet information and control using a system API at a central management service 300 via the cloud. The central management service 300 may be implemented using a serverless service such as Amazon Web Services (AWS) Lambda, AWS Fargate, a Containers-as-a-Service (CaaS) provider, or one or more servers deployed in the cloud, in a content delivery network (CDN), etc. The API gateway 302 allows access to system APIs that can be used by the user device 103 in order to perform various operations on the bitcoin mining systems or bitcoin mining system groups. The system APIs offer a richer and broader feature set than the miner APIs. The system APIs allow user device 103 to monitor and configure groups or pools of bitcoin miners simultaneously via the central management service 300. Since central management service 300 is in the cloud, multiple users across multiple user devices can communicate with the central management service 300 in order to manage and monitor their own separate bitcoin mining facilities. Central management service 300 can is easily scalable and can handle any number of mining facilities 105. In an embodiment, the API approach discussed herein can be implemented in the central management server 104 as discussed above. Central management server 104 can provide system APIs and be communicatively connected to storage/database 206 or, additionally or alternatively, a database system shared among multiple central management servers.

Central management software running in the central management service 300 can monitor the status of the bitcoin mining systems 101*a*-101*n* in real-time. Central management service 300 implements push notification via Web Socket 301 to avoid frequent polling. For example, AWS provides push notifications via Web Socket 301 in API gateway 302 and the Lambda function in the serverless systems/server instantiations 303*a*-303*n*. AWS can push messages to a particular Web Socket established with a bitcoin mining system using connection IDs. The system APIs are made part of the AWS Lambda function 303*a*-303*n* and integrated with AWS API gateway 302 which terminates the Web Socket connection. The architecture of the system allows the central management service 300 to handle a large number of bitcoin mining systems. Users can group the bitcoin mining systems into large pools or groups that can be simultaneously managed via the persistent Web Socket connections between each bitcoin mining system and the central management service 300. When a system API sends a command to multiple bitcoin mining systems, the software sends the command to each connection having connection IDs that correspond to the bitcoin mining systems that it needs to control or query (as discussed herein). If a bitcoin mining system has a problem that interferes with its communication to the central management service 300, it can reconnect using the Web Socket 301.

In an embodiment, bitcoin mining systems can establish and maintain real-time bi-directional communication channels using Web Socket 301 with API gateway 302 or one or more central management servers, for example. The bitcoin mining system registers endpoints using Web Socket 301 for cloud management software or other orchestration software to interact with directly over the cloud. This enables real-time updates to and from the bitcoin mining systems and the central management software running in the serverless systems/server instantiations 303*a*-303*n*. Note that when one or more central management servers are used, the central management software may be implemented on one or more of the central management servers or as dedicated hardware in a NIC card or other card in one or more central management servers.

In an embodiment, authentication between user device 103 and the API gateway 302 may be through an Auth0 access token. The user obtains the API key from the bitcoin central management administrator or registered user portal. The API key is used by user device 103 to call the miner or system APIs. In this example, API key verification can be performed in the AWS Lambda function to ensure a particular user is authorized to make the requested system API call.

API gateway 302 and serverless systems 303*a*-303*n* store user and bitcoin mining system information in database 304. The user is onboarded using a registered user portal, for example. During the onboarding process users and their roles are stored in database 304 as the user registers with the service. The central management software running in the serverless systems 303*a*-303*n* can perform a bitcoin mining system registration process as each bitcoin mining system is booted and comes online. As each bitcoin mining system establishes a communications connection with central management service 300, the bitcoin mining system's information, such as, system identification, connection ID, hardware components (e.g., processor type/ID, power supply, memory sizes, etc.), software and hardware versions, etc., can be stored and organized in database 304. The Web Socket connection ID per bitcoin mining system is stored in database 304. During runtime, bitcoin mining system responses to the system API commands and queries are stored in database 304, e.g., configuration settings, e.g., power consumption, hash rate, network settings, etc., as well as system performance statistics and system information, e.g., internal temperatures, external temperatures, fan speed(s), hash rates, power settings, measured power consumption, etc. Server instantiations can send commands to the bitcoin mining systems through the system API connections and control configuration parameters, e.g., hash rate, power level, cooling fan activation/deactivation, speed setting of activated fans, etc.

User device commands and requests are handled by a system API that the user device 103 establishes a connection with. The system API can gather information from database 304 in order to prepare a response, e.g., prepare reports, calculate aggregate values/statistics, retrieve specific bitcoin mining system information and/or statistics, pool/group statistics, etc., to a user device request. For user device commands and requests that require a real-time response from bitcoin mining systems, the system API gathers the responses (e.g., successful/unsuccessful operation, device status, power consumption, hash rate, etc.) from the bitcoin mining systems to create a response to the user device request. Once the system API has a response prepared, it sends the response to the requesting user device via the connection associated with the user device 103. The user can control pool, group, and/or individual bitcoin mining system configuration settings (such as the configuration parameters discussed herein) or operations (e.g., Software upgrades, putting the bitcoin mining system into standby or running state, etc.) using commands via the connection between the user device 103 and a system API. The system API formulates appropriate mining system commands for the bitcoin mining systems in response to a user device command to configure or control the bitcoin mining systems. The system API uses the connection identifiers for the bitcoin mining systems to send the mining system commands to the bitcoin mining systems.

Figure 4:
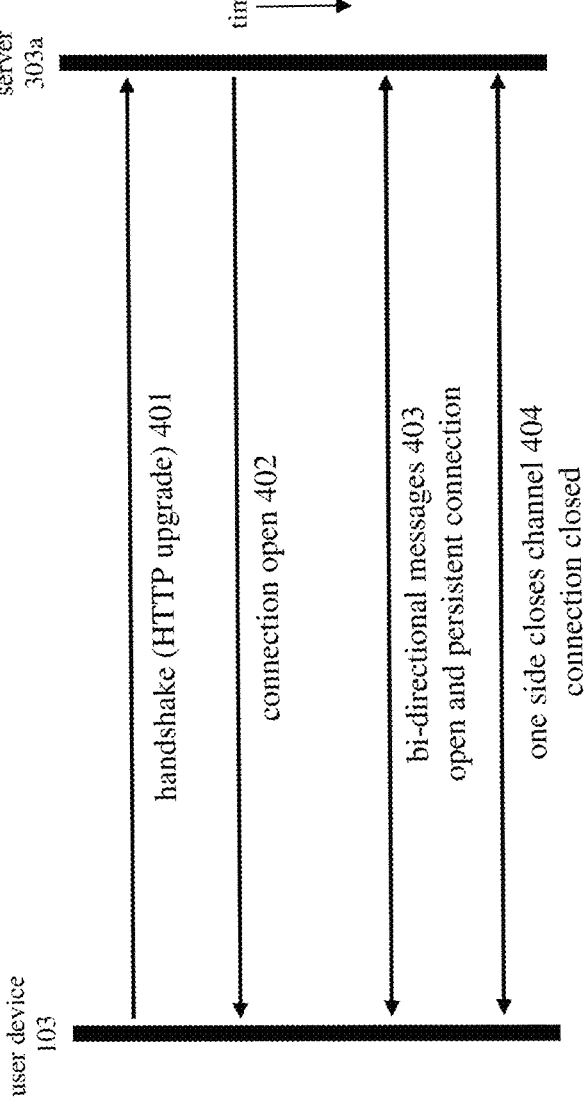
FIG. 4 illustrates a timing diagram of bi-directional communications connection between a user device and a central management server, according to an embodiment.

Referring to FIG. 4, a system API session is shown. The user is onboarded using a registered user portal, for example. The user generates a unique API key on the registered user portal. The user downloads and saves the API key to use it to call the miner and system APIs. The user calls a cloud system API made available by central management service 300 with the API key through API gateway 302 using Auth0 IdP via Web Socket 301. User device 103 uses the API key to setup and access 401 the system API running in serverless system/server instantiation 303*a*, for example. API gateway 302 verifies the user identity using the API key. API gateway 302 authorizes/validates the user device 103 by checking if the API key is in the list of permitted API keys. If valid, the system API opens a connection 402 between the system API and the user device 103. Once the connection has been opened the user device 103 and the system API can send bi-directional messages across the connection 403. The connection stays open until a timeout or either the system API or the user device 103 closes the connection 404.

Note that although bitcoin is mentioned specifically in the above discussions and examples, any digital/crypto currency that requires mining systems can be improved using the material discussed herein.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

Note that, although separate embodiments are discussed herein, any combination of embodiments and/or partial embodiments discussed herein may be combined to form further embodiments.

3.0. Implementation Mechanisms-Hardware Overview

Figure 5:
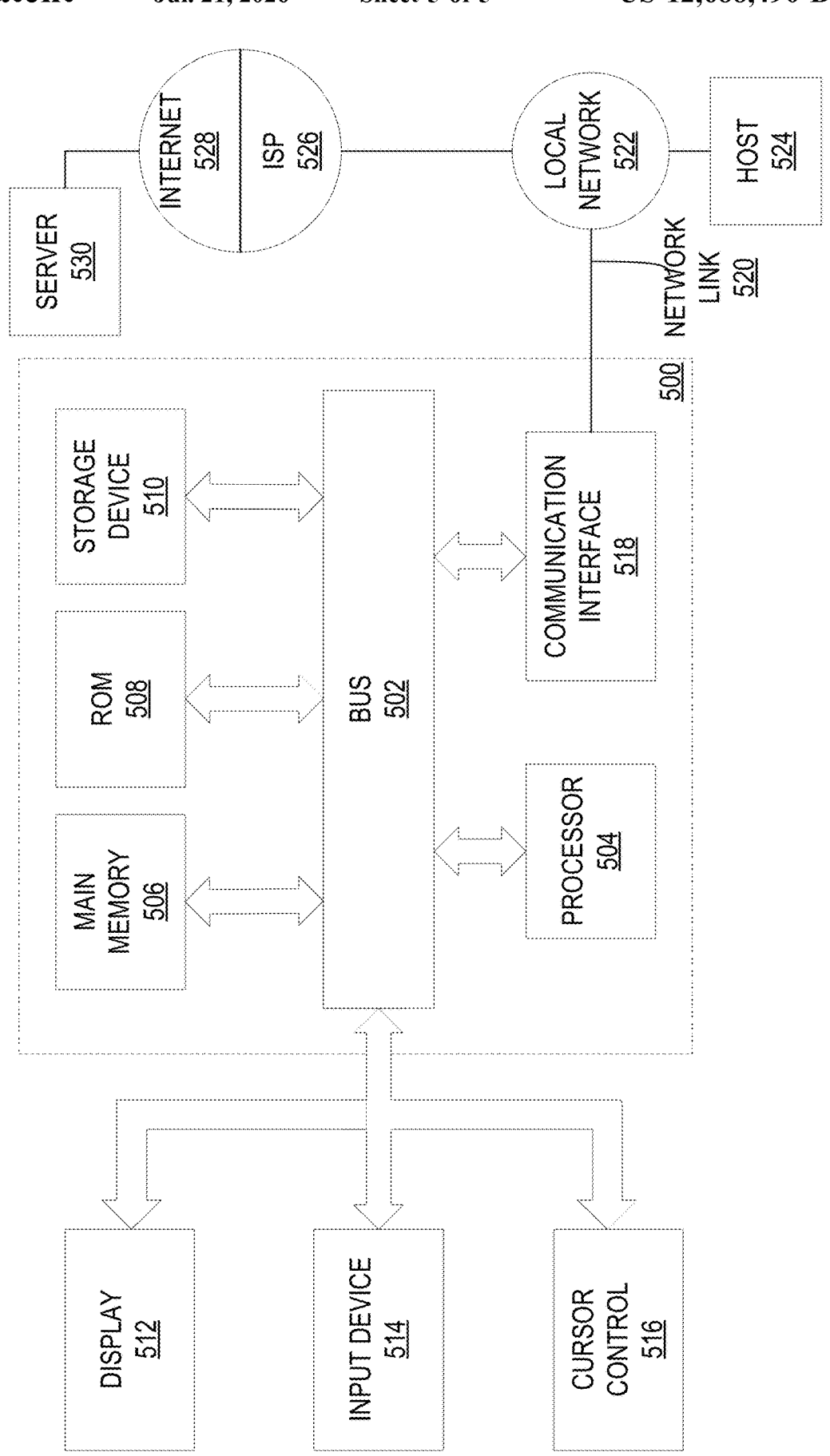
FIG. 5 is a block diagram of a computer system upon which embodiments of the invention may be implemented.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

4.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method comprising:

receiving, at a cloud-based server, a unique hardware public key and a corresponding device serial number for each digital currency mining system among a plurality of digital currency mining systems, from a manufacturing server;

storing, by the cloud-based server, the unique hardware public key in association with the corresponding device serial number for each digital currency mining system among the plurality of digital currency mining systems in a storage system;

establishing, by the cloud-based server, a separate real-time bi-directional communication channel for each digital currency mining system among the plurality of digital currency mining systems;

wherein the cloud-based server communicates with each digital currency mining system among the plurality of digital currency mining systems over an associated separate bi-directional connection via a first service Application Programming Interface (API);

receiving, at the cloud-based server, a registration message including a specific software public key from a digital currency mining system among the plurality of digital currency mining systems;

verifying, by the cloud-based server, the registration message received from the digital currency mining system using the stored unique hardware public key associated with the digital currency mining system;

storing, by the cloud-based server, the specific software public key in association with the stored unique hardware public key and the corresponding device serial number for the digital currency mining system in the storage system, wherein communications with the plurality of digital currency mining systems use stored unique hardware public keys or stored specific software keys based on a security level of the communications;

receiving, at the cloud-based server, data from the digital currency mining system via the separate associated bi-directional connection, wherein the data includes any of: digital currency mining system performance statistics or system information;

verifying, by the cloud-based server, the received data from the digital currency mining system using the stored specific software public key associated with the digital currency mining system;

storing, by the cloud-based server, the verified received data in association with the digital currency mining system;

wherein the cloud-based server pushes commands and queries to one or more digital currency mining systems among the plurality of digital currency mining systems via the associated separate bi-directional connections.

2. The method of claim 1, further comprising:

selecting, by the cloud-based server, an associated separate bi-directional connection for a specific digital currency mining system among the plurality of digital currency mining systems by looking up a connection identifier associated with the specific digital currency mining system.

3. The method of claim 1, further comprising:

assigning, by the cloud-based server, one or more digital currency mining systems among the plurality of digital currency mining systems to one or more groups;

sending, by the cloud-based server, a command to a group among the one or more groups through the separate bi-directional connections associated with each of the digital currency mining systems in the group.

4. The method of claim 1, further comprising:

assigning, by the cloud-based server, one or more digital currency mining systems among the plurality of digital currency mining systems to one or more groups;

determining, by the cloud-based server, a connection identifier associated with each digital currency mining system in a particular group;

sending, by the cloud-based server, a command to each digital currency mining system in the particular group through separate bi-directional connections identified using the associated connection identifier.

5. The method of claim 1, further comprising:

receiving, by the cloud-based server, a user query via a second service API from a user device;

calculating a statistical response from stored data for one or more digital currency mining systems among the plurality of digital currency mining systems;

sending, by the cloud-based server, the statistical response to the user device via the second service API.

6. The method of claim 1, further comprising:

receiving, by the cloud-based server, a user query via a second service API from a user device;

calculating an aggregate response from stored data for two or more digital currency mining systems among the plurality of digital currency mining systems;

sending, by the cloud-based server, the aggregate response to the user device via the second service API.

7. The method of claim 1, further comprising:

assigning, by the cloud-based server, one or more digital currency mining systems among the plurality of digital currency mining systems to one or more groups;

receiving, by the cloud-based server, a user command for a particular group of the one or more groups via a second service API from a user device;

formulating, by the cloud-based server, one or more mining system commands related to the user command;

sending, by the cloud-based server, the one or more mining system commands to each digital currency mining system in the particular group through the separate bi-directional connections associated with each digital currency mining system in the particular group.

8. The method of claim 1, wherein the digital currency is bitcoin.

9. One or more non-transitory computer-readable storage media, storing one or more sequences of instructions, which when executed by one or more processors cause performance of:

receiving, at a cloud-based server, a unique hardware public key and a corresponding device serial number for each digital currency mining system among a plurality of digital currency mining systems, from a manufacturing server;

storing, by the cloud-based server, the unique hardware public key in association with the corresponding device serial number for each digital currency mining system among the plurality of digital currency mining systems in a storage system;

establishing, by the cloud-based server, a separate real-time bi-directional communication channel for each digital currency mining system among the plurality of digital currency mining systems;

wherein the cloud-based server communicates with each digital currency mining system among the plurality of digital currency mining systems over an associated separate bi-directional connection via a first service Application Programming Interface (API);

receiving, at the cloud-based server, a registration message including a specific software public key from a digital currency mining system among the plurality of digital currency mining systems;

verifying, by the cloud-based server, the registration message received from the digital currency mining system using the stored unique hardware public key associated with the digital currency mining system;

storing, by the cloud-based server, the specific software public key in association with the stored unique hardware public key and the corresponding device serial number for the digital currency mining system in the storage system, wherein communications with the plurality of digital currency mining systems use stored unique hardware public keys or stored specific software keys based on a security level of the communications;

receiving, at the cloud-based server, data from the digital currency mining system via the separate associated bi-directional connection, wherein the data includes any of: digital currency mining system performance statistics or system information;

verifying, by the cloud-based server, the received data from the digital currency mining system using the stored specific software public key associated with the digital currency mining system;

storing, by the cloud-based server, the verified received data in association with the digital currency mining system;

wherein the cloud-based server pushes commands and queries to one or more digital currency mining systems among the plurality of digital currency mining systems via the associated separate bi-directional connections.

10. The one or more non-transitory computer-readable storage media of claim 9, further comprising:

selecting, by the cloud-based server, an associated separate bi-directional connection for a specific digital currency mining system among the plurality of digital currency mining systems by looking up a connection identifier associated with the specific digital currency mining system.

11. The one or more non-transitory computer-readable storage media of claim 9, further comprising:

assigning, by the cloud-based server, one or more digital currency mining systems among the plurality of digital currency mining systems to one or more groups;

sending, by the cloud-based server, a command to a group among the one or more groups through the separate bi-directional connections associated with each of the digital currency mining systems in the group.

12. The one or more non-transitory computer-readable storage media of claim 9, further comprising:

assigning, by the cloud-based server, one or more digital currency mining systems among the plurality of digital currency mining systems to one or more groups;

determining, by the cloud-based server, a connection identifier associated with each digital currency mining system in a particular group;

sending, by the cloud-based server, a command to each digital currency mining system in the particular group through separate bi-directional connections identified using the associated connection identifier.

13. The one or more non-transitory computer-readable storage media of claim 9, further comprising:

receiving, by the cloud-based server, a user query via a second service API from a user device;

calculating a statistical response from stored data for one or more digital currency mining systems among the plurality of digital currency mining systems;

sending, by the cloud-based server, the statistical response to the user device via the second service API.

14. The one or more non-transitory computer-readable storage media of claim 9, further comprising:

receiving, by the cloud-based server, a user query via a second service API from a user device;

calculating an aggregate response from stored data for two or more digital currency mining systems among the plurality of digital currency mining systems;

sending, by the cloud-based server, the aggregate response to the user device via the second service API.

15. The one or more non-transitory computer-readable storage media of claim 9, further comprising:

assigning, by the cloud-based server, one or more digital currency mining systems among the plurality of digital currency mining systems to one or more groups;

receiving, by the cloud-based server, a user command for a particular group of the one or more groups via a second service API from a user device;

formulating, by the cloud-based server, one or more mining system commands related to the user command;

sending, by the cloud-based server, the one or more mining system commands to each digital currency mining system in the particular group through the separate bi-directional connections associated with each digital currency mining system in the particular group.

16. The one or more non-transitory computer-readable storage media of claim 9, wherein the digital currency is bitcoin.

17. A cloud-based server comprising:

one or more processors; and a memory storing instructions, which when executed by the one or more processors, cause the one or more processors to perform:

receiving a unique hardware public key and a corresponding device serial number for each digital currency mining system among a plurality of digital currency mining systems, from a manufacturing server;

storing the unique hardware public key in association with the corresponding device serial number for each digital currency mining system among the plurality of digital currency mining systems in a storage system;

establishing a separate real-time bi-directional communication channel for each digital currency mining system among the plurality of digital currency mining systems;

wherein the cloud-based server communicates with each digital currency mining system among the plurality of digital currency mining systems over an associated separate bi-directional connection via a first service Application Programming Interface (API);

receiving a registration message including a specific software public key from a digital currency mining system among the plurality of digital currency mining systems;

verifying the registration message received from the digital currency mining system using the stored unique hardware public key associated with the digital currency mining system;

storing the specific software public key in association with the stored unique hardware public key and the corresponding device serial number for the digital currency mining system in the storage system, wherein communications with the plurality of digital currency mining systems use stored unique hardware public keys or stored specific software keys based on a security level of the communications;

receiving data from the digital currency mining system via the separate associated bi-directional connection, wherein the data includes any of: digital currency mining system performance statistics or system information;

verifying the received data from the digital currency mining system using the stored specific software public key associated with the digital currency mining system;

storing the verified received data in association with the digital currency mining system;

pushing commands and queries to one or more digital currency mining systems among the plurality of digital currency mining systems via the associated separate bi-directional connections.

18. The cloud-based server of claim 17, wherein the instructions, which when executed by the one or more processors, cause the one or more processors to further perform:

selecting an associated separate bi-directional connection for a specific digital currency mining system among the plurality of digital currency mining systems by looking up a connection identifier associated with the specific digital currency mining system.

19. The cloud-based server of claim 17, wherein the instructions, which when executed by the one or more processors, cause the one or more processors to further perform:

assigning one or more digital currency mining systems among the plurality of digital currency mining systems to one or more groups;

sending a command to a group among the one or more groups through the separate bi-directional connections associated with each of the digital currency mining systems in the group.

20. The cloud-based server of claim 17, wherein the instructions, which when executed by the one or more processors, cause the one or more processors to further perform:

assigning one or more digital currency mining systems among the plurality of digital currency mining systems to one or more groups;

receiving a user command for a particular group of the one or more groups via a second service API from a user device;

formulating one or more mining system commands related to the user command;                                     5 sending the one or more mining system commands to each digital currency mining system in the particular group through the separate bi-directional connections associated with each digital currency mining system in the particular group.                                     10

<p style="text-align:center">*   *   *   *   *</p>